(12) United States Patent
Wier

(10) Patent No.: US 6,820,901 B2
(45) Date of Patent: Nov. 23, 2004

(54) BELT RETRACTOR FOR A VEHICLE SAFETY BELT

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 58 days.

(21) Appl. No.: 10/214,011

(22) Filed: Aug. 7, 2002

(65) Prior Publication Data

US 2003/0034644 A1 Feb. 20, 2003

(30) Foreign Application Priority Data

Aug. 17, 2001 (DE) ..................... 201 13 656 U

(51) Int. Cl.⁷ .............................................. B60R 22/36
(52) U.S. Cl. ..................................................... 280/806
(58) Field of Search .............................. 280/806, 807, 280/805; 242/379.1, 384, 396.1, 396.4

(56) References Cited

U.S. PATENT DOCUMENTS

| | | | | |
|---|---|---|---|---|
| 5,931,402 A | * | 8/1999 | Weller | 242/383.2 |
| 6,598,822 B2 | * | 7/2003 | Nagata et al. | 242/379.1 |
| 2002/0050542 A1 | * | 5/2002 | Nagata et al. | 242/379.1 |

FOREIGN PATENT DOCUMENTS

| | | |
|---|---|---|
| DE | 19733787 C1 | 12/1998 |
| DE | 19747461 A1 | 4/1999 |
| DE | 29906629 U1 | 10/1999 |
| DE | 20004674 U1 | 9/2000 |
| DE | 20007238 U1 | 9/2000 |
| DE | 19780583 C1 | 1/2001 |
| DE | 19927427 A1 | 1/2001 |
| DE | 20015402 U1 | 2/2001 |
| EP | 1022201 A1 | 7/2000 |

* cited by examiner

Primary Examiner—Faye M. Fleming
(74) Attorney, Agent, or Firm—Tarolli, Sundheim, Covell & Tummino L.L.P.

(57) ABSTRACT

A belt retractor for a vehicle safety belt comprises a frame, a belt reel rotatably mounted in the frame, at least a first and a second energy-absorbing element, which each has a connecting end and a locking end, wherein the locking ends each are provided with a locking disc and adapted to be selectively connected with the frame. The belt retractor further comprises a first and a second locking pawl which by means of at least one actuating device can each selectively be brought into engagement in one of the locking discs, wherein at least one switching device is provided which can selectively prevent the engagement action of at least one locking pawl.

10 Claims, 3 Drawing Sheets

BELT RETRACTOR FOR A VEHICLE SAFETY BELT

TECHNICAL FIELD

This invention relates to a belt retractor for a vehicle safety belt.

BACKGROUND OF THE INVENTION

The energy-absorbing elements in a belt retractor act as force limiters which ensure that a controlled reverse rotation of the belt reel is effected in the direction of belt unwinding when excessively high forces act in the safety belt provided by the belt retractor. The level of force limitation is determined by the torsional resistance provided by the energy-absorbing elements and is changed in dependence on various influencing factors such as in particular the weight of the vehicle occupant to be restrained or the severity of the accident. In belt retractors known from the prior art, this is achieved by the selective coupling and uncoupling of individual energy-absorbing elements. From DE 200 04 674 U1, for instance, there is known a belt retractor comprising two energy-absorbing elements, each of which has a locking end with locking pawl. The two locking pawls are connected with each other by a connecting element, so that the engagement action of one locking pawl at the same time effects the engagement action of the other locking pawl. When the locking pawls are engaged, one locking end is non-rotatably connected with the frame, and the other locking end is non-rotatably connected with a holding ring, which in turn can non-rotatably be connected with the frame via a latch. When this latch is released, so that the non-rotatable connection between the holding ring and the frame is eliminated, the two locking ends can rotate relative to each other. The connection of the two locking pawls can be separated at a predetermined breaking point of the connecting element, so that the force acting against a rotation of the belt reel in the direction of belt unwinding solely results from the torsional resistance moment of an energy-absorbing element.

BRIEF SUMMARY OF THE INVENTION

The invention provides a belt retractor for a vehicle safety belt, in which the force limitation level can freely be adjusted by a selective deactivation of energy-absorbing elements.

This is achieved in a belt retractor for a vehicle safety belt which comprises a frame, a belt reel rotatably mounted in the frame, at least a first and a second energy-absorbing element, which each has a connecting end and a locking end, wherein the locking ends each are provided with a locking disc and adapted to be selectively connected with the frame. The belt retractor further comprises a first and a second locking pawl which by means of at least one actuating device can each selectively be brought into engagement in one of the locking discs, wherein at least one switching device is provided, which can selectively prevent the engagement action of at least one locking pawl. In dependence on various influencing factors such as the weight of the vehicle occupant and/or the severity of the accident, the switching device can prevent that one or more locking pawls are engaged in the associated locking teeth in the case of a vehicle impact.

Further features and advantageous aspects of the invention can be taken from the sub-claims.

DETAILED DESCRIPTION OF THE INVENTION

Figure 1:
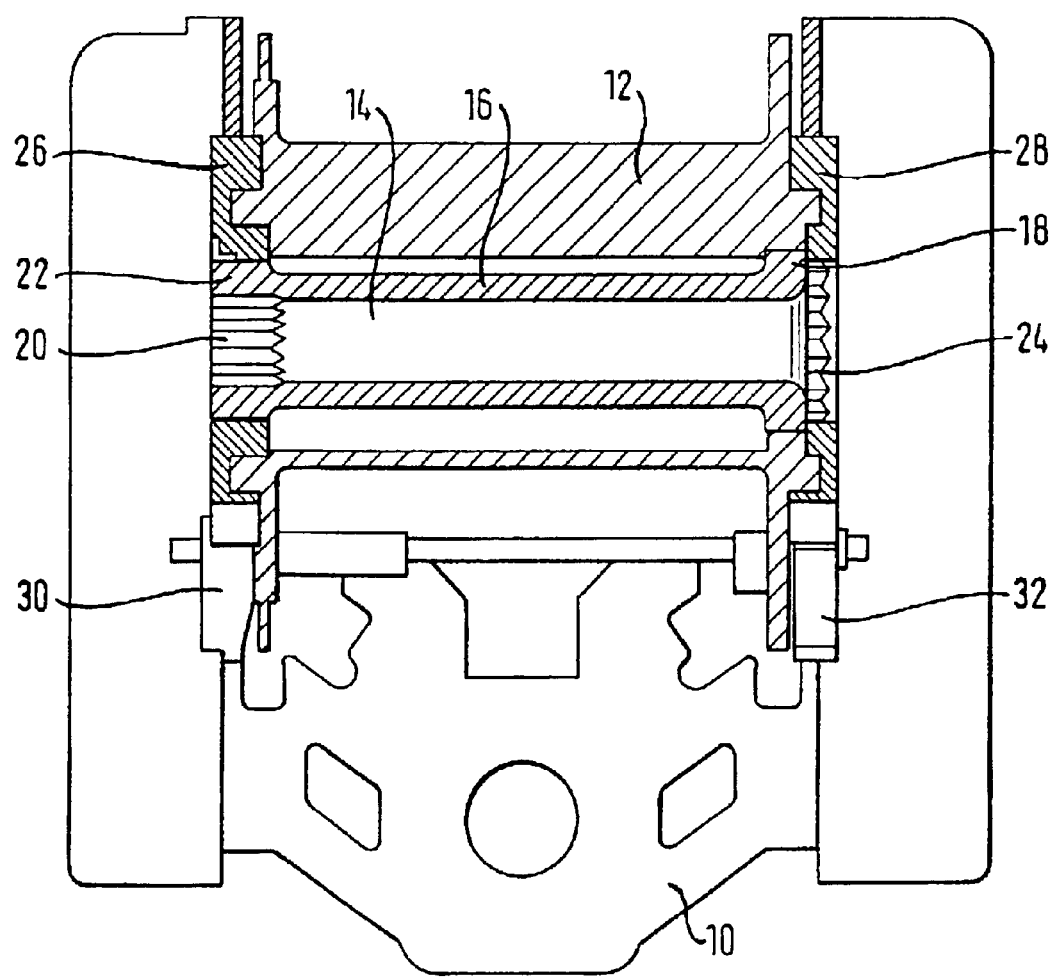
FIG. 1 shows a perspective, partly sectional view of a belt retractor with force limiter.

The belt retractor shown in FIG. 1 has a frame 10 in which a belt reel 12 is rotatably mounted. The belt reel 12 serves to wind up a belt webbing (not shown here) which forms a safety belt for restraining a vehicle occupant In the interior of the belt reel 12 a first and a second energy-absorbing element are disposed, which in this case constitute a torsion bar 14 and a torsion tube 16 concentrically surrounding the torsion bar. At the axial end to the right with respect to FIG. 1, the torsion tube 16 has a connecting end 18, at which it is non-rotatably connected with the belt reel 12. At its axial end to the left with respect to FIG. 1, the torsion bar 14 has a connecting end 20, at which it is non-rotatably connected with the torsion tube. At the end opposite the connecting end 18 or 20, the torsion tube 16 and the torsion bar 14 each have a locking end 22 and 24, respectively, which in turn are non-rotatably connected with a respective locking disc 26 or 28. A first and a second locking pawl 30 and 32, respectively, are rotatably mounted with respect to the frame 10 and serve to selectively be brought into engagement in the locking teeth of the locking disc 26 or 28 of the torsion tube or the torsion bar, respectively. Engagement is each effected by means of an actuating device, as it will be described below with reference to FIG. 2. For reasons of clarity, not all parts of this actuating device are shown in FIG. 1.

When both the locking pawl 30 and the locking pawl 32 is engaged in the locking teeth of the locking disc 26 and 28, respectively, the torsion tube is non-rotatably connected with the frame at its locking end 22 and is non-rotatably connected with the belt reel at its connecting end 18, so that the force acting against a rotation of the belt reel in the direction of belt unwinding results from the torsion resistance moment of the torsion tube. When only the locking pawl 32 to the right with respect to FIG. 1 is engaged, the torsion tube and the torsion bar are connected in series, so that a second resistance force is obtained, which differs from the resistance force only provided by the torsion tube. It is thus possible to switch between two different force levels.

Figure 2:
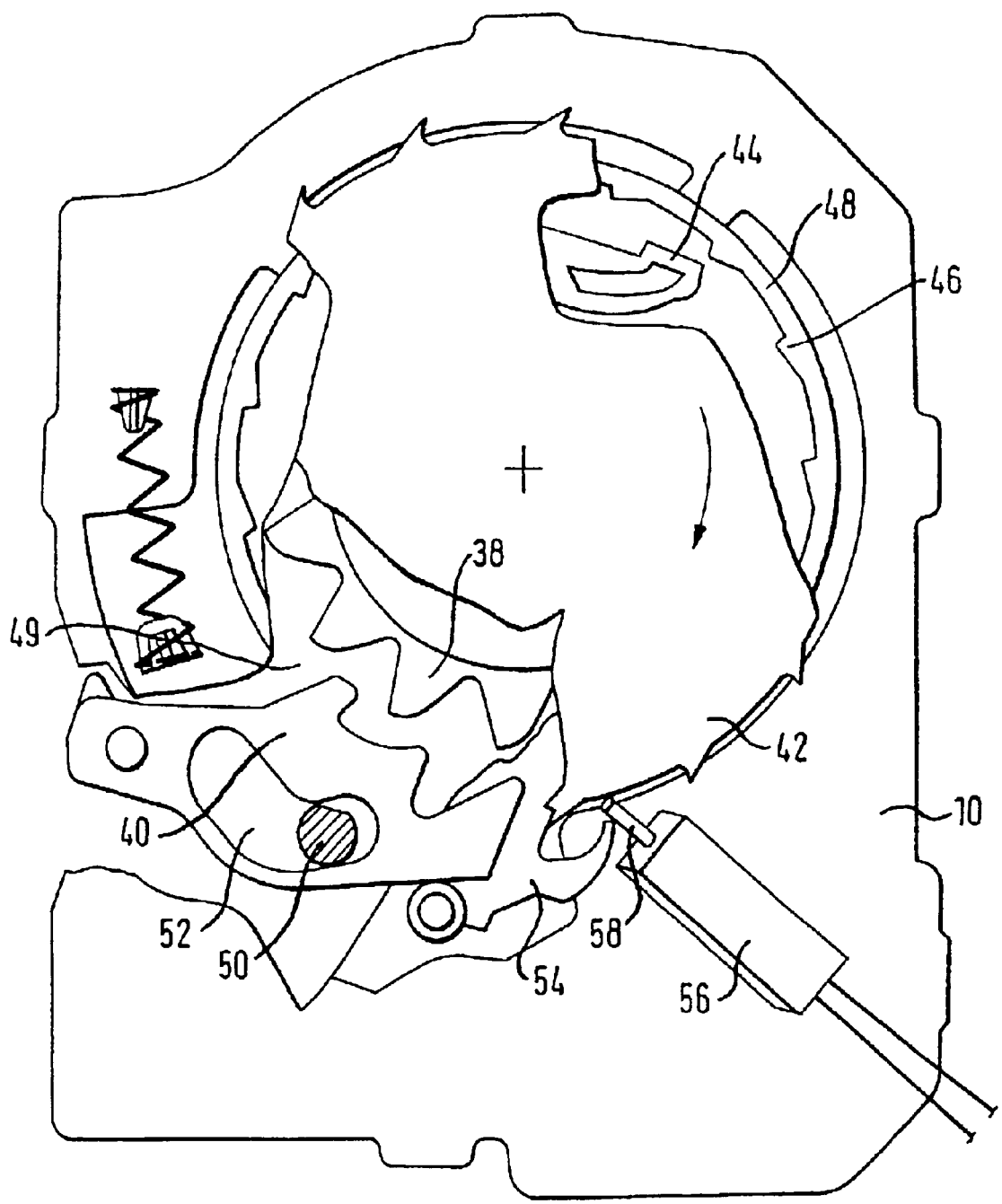
FIG. 2 shows a partly sectional side view of a belt retractor with an inventive switching device.

FIG. 2 schematically shows a belt retractor with an inventive switching device Apart from the frame 10 and a belt reel rotatably mounted therein, the belt retractor includes a locking disc with locking teeth 38 A locking pawl 40 is provided for engagement in the locking teeth 38 and serves to block the locking disc. Furthermore, the belt retractor includes a coupling disc 42 connected with the belt reel, at which coupling disc a coupling pawl 44 is mounted. The coupling pawl 44 can be brought into engagement in internal teeth 46 of a control wheel 48 in a vehicle-sensitive way, so that the belt reel is connected with the control wheel 48 via the coupling disc 42 and the coupling pawl 44 and a rotational movement of the belt reel is converted into a rotational movement of the control wheel 48. To the control wheel 48 a control lever 49 is molded, which carries a pin 50 which engages in a recess 52 of the locking pawl 40. A swivel movement of the control lever 49, which is caused by a rotation of the control wheel 48 relative to the frame 36, effects a corresponding movement of the pin 50 along a circular arc. The pin 50 engages a radial cam of the recess 52, in order to enforce a swivel movement of the locking pawl 40 into the locking teeth 38 of the locking disc. The belt reel then is blocked with respect to a further rotation in the direction of belt unwinding.

The engagement action of the coupling pawl 44 in the internal teeth 46 of the control wheel 48 is effected via an auxiliary pawl 54 which can be actuated via a vehicle-sensitive sensor (not shown), so that it engages in the external teeth of the coupling disc 42 and a further rotation of the coupling disc 42 in the direction of belt unwinding is prevented. A further rotation of the belt reel in the direction of belt unwinding then effects that the coupling pawl 44 engages in the internal teeth 46 of the control wheel 48.

At the frame 36, there is also provided a switching device which comprises a lifting magnet 56 with a pin 58. The lifting magnet 56 and the pin 58 are positioned such that when the pin 58 is lifted by the lifting magnet 56, the auxiliary pawl 54 is prevented from engaging in the external teeth of the coupling disc 42. As a result, the control wheel 48, too, is not connected with the belt reel via the coupling pawl 44, and the locking pawl 40 is not swiveled into the locking teeth 38. When the locking teeth are provided on a locking disc which is connected with an energy-absorbing element, the force limitation level can selectively be adjusted by means of the switching device In accordance with the invention it is, however, also possible that a locking element corresponding to the pin is actuated electrically or mechanically and not via a lifting magnet.

In accordance with the invention it is furthermore provided that the auxiliary pawl 54 shown in FIG. 2 may also be designed differently. Its function may for instance also be performed by the sensor lever of a vehicle-sensitive sensor mounted at the frame. The sensor lever is mounted above a sensor ball and, when the sensor ball is deflected from the depression of a ball seat, is swiveled into the external teeth of the coupling disc.

In the belt retractor shown in FIG. 1, the engagement action of the locking pawls 30 and 32 in the locking teeth 26 and 28 can each be effected via an above-described vehicle-sensitive actuating device, which comprises a coupling disc and a locking disc. When on the left side with respect to FIG. 1 a switching device is provided in addition, for instance in the form of a lifting magnet and pin, which can prevent the engagement action of the locking pawl 30, switching can selectively be effected between two different force levels. In dependence on the conditions of an accident and/or the weight of the vehicle occupant, either both pawls 30, 32 are engaged, so that the torsion tube contributes to the force acting against a rotation of the belt reel in the direction of belt unwinding, or the pawl 30 is prevented from engaging, so that the torsion bar and the torsion tube are connected in series and a second force limitation level different from the first one is obtained. Since the pawl 30 is prevented from engaging, in that right at the beginning of the locking operation the coupling disc 42 is prevented from blocking in the direction of belt unwinding, the locking mechanism is not damaged by the actuation of the switching device in the case of restraint. Upon relief and in a new case of restraint, both locking pawls 30, 32 or only the locking pawl 32 can thus again be brought into engagement selectively.

Figure 3:
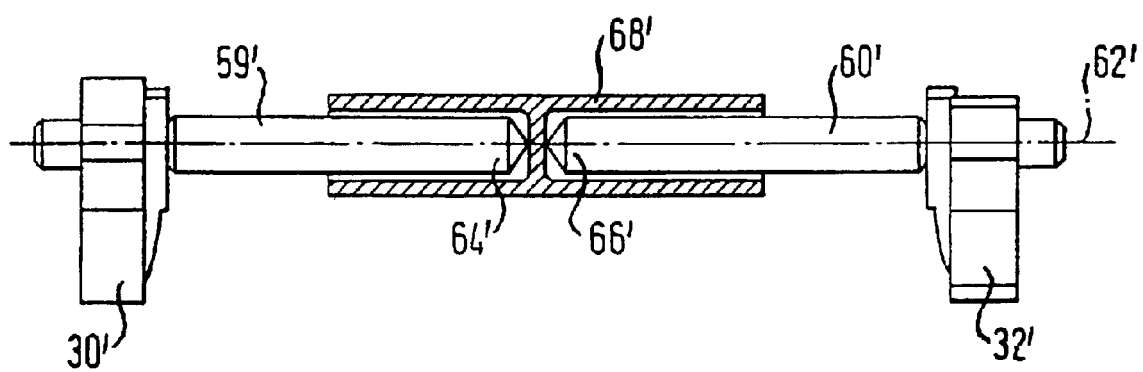
FIG. 3 shows a partly sectional top view of a locking pawl mounting.

In the above-described selective engagement action of the two locking pawls it is necessary that the locking pawls are mounted such that they can move independent of each other. Such inventive mounting is illustrated in FIG. 3. The first locking pawl 30' and the second locking pawl 32' are located at opposite ends of the two energy-absorbing elements and are each non-rotatably mounted on a first axis 59' and on a second axis 60', respectively. The first and second axes 59', 60' are mounted so as to be rotatable with respect to the frame (not shown here), namely such that they have a common axis of rotation 62'. For additionally mounting the first and second axes 59', 60', a bearing sleeve 68' is provided at the ends 64', 66' of the first and second axes opposite the locking pawls 30', 32'. The ends 64', 66' opposite the locking pawls are conically tapered, in order to ensure a rather low frictional resistance in the case of a relative rotation of the first and second axes with respect to each other.

Due to the mounting illustrated in FIG. 3 it is possible to selectively engage the first and second locking pawls 30', 32' in the corresponding locking teeth of the locking ends. However, this is also possible when (as shown in FIG. 1) the first and second locking pawls 30, 32 are each rotatably mounted on a common axis. The common axis then is non-rotatably mounted with respect to the frame.

What is claimed is:

1. A belt retractor for a vehicle safety belt, comprising a frame, a belt reel rotatably mounted in the frame, at least a first and a second energy-absorbing element, which each has connecting ends and locking ends, said locking ends each being provided with a locking disc and adapted to be selectively connected with said frame, and comprising a first and a second locking pawl which by means of at least one actuating device can each selectively be brought into engagement in one of said locking discs, and wherein at least one switching device is provided which can selectively prevent the engagement action of at least one locking pawl in order to operate between a force limiting process in a first condition in which one of the energy-absorbing elements is engaged and a second condition in which both of the energy absorbing elements are engaged.

2. The belt retractor as claimed in claim 1, wherein said locking ends of said first and second energy-absorbing elements are provided at opposite ends of said energy-absorbing elements.

3. The belt retractor as claimed in claim 2, wherein said connecting end of said first energy-absorbing element is non-rotatably connected with said locking end of said second energy-absorbing element and said connecting end of said second energy-absorbing element is non-rotatably connected with said belt reel.

4. The belt retractor as claimed in claim 1, wherein said first and second locking pawls are rotatably mounted on a common axis.

5. The belt retractor as claimed in claim 1, wherein said first and second locking pawls are each non-rotatably mounted on a first and second axis, said first and second axes being rotatably mounted with respect to a common axis of rotation.

6. The belt retractor as claimed in claim 1, wherein said first energy-absorbing element is a torsion bar and said second energy-absorbing element is a torsion tube.

7. The belt retractor as claimed in claim 1, wherein operation of said first and second energy absorbing elements together absorbs energy at a different force level during a force limitation process than operation of only one of said first and second energy absorbing elements.

8. A belt retractor for a vehicle safety belt, comprising a frame, a belt reel rotatably mounted in the frame, at least a first and a second energy-absorbing element, which each has connecting ends and locking ends, said locking ends each being provided with a locking disc and adapted to be selectively connected with said frame, and comprising a first and a second locking pawl which by means of at least one actuating device can each selectively be brought into engagement in one of said locking discs, and wherein at least one switching device is provided which can selectively prevent the engagement action of at least one locking pawl, said locking ends of said first and second energy-absorbing elements are provided at opposite ends of said energy-absorbing elements, said first locking pawl and said second locking pawl can each be brought into engagement in one of said locking discs by means of an actuating device, each actuating device being adapted to be activated in a vehicle-sensitive manner.

9. The belt retractor as claimed in claim 8, wherein said switching device can selectively prevent the vehicle-sensitive activation of said actuating device.

10. The belt retractor as claimed in claim 9, wherein said actuating device comprises a coupling disc connected with said belt reel, at the periphery of said coupling disc locking teeth being provided, in which can engage an auxiliary pawl adapted to be actuated by a vehicle-sensitive sensor, and said switching device being able to selectively prevent said engagement of said auxiliary pawl in said locking teeth.

* * * * *